United States Patent [19]
Konuma

[11] Patent Number: 5,589,876
[45] Date of Patent: Dec. 31, 1996

[54] INFRARED IMAGING DEVICE READILY REMOVING OPTICAL SYSTEM CONTRIBUTORY COMPONENT

[75] Inventor: Kazuo Konuma, Tokyo, Japan

[73] Assignee: NEC Corporation, Tokyo, Japan

[21] Appl. No.: 308,932

[22] Filed: Sep. 20, 1994

[30] Foreign Application Priority Data

Sep. 28, 1993 [JP] Japan .................................. 5-240981

[51] Int. Cl.[6] ........................... H04N 5/217; H01L 25/00
[52] U.S. Cl. ........................... 348/164; 348/241; 250/332
[58] Field of Search ...................................... 348/164, 165, 348/166, 241, 311, 244, 294; 250/332

[56] References Cited

U.S. PATENT DOCUMENTS

| | | | |
|---|---|---|---|
| 4,246,480 | 1/1981 | Clark | 250/349 |
| 4,757,200 | 7/1988 | Shepherd | 250/332 |
| 5,095,211 | 3/1992 | Kimata | 250/370.08 |
| 5,444,484 | 8/1995 | Yutani et al. | 348/305 |

FOREIGN PATENT DOCUMENTS

| | | |
|---|---|---|
| 58-122904 | 7/1983 | Japan . |
| 6014578 | 1/1985 | Japan . |
| 1-97074 | 9/1987 | Japan .................. H04N 5/33 |
| 62-195634 | 12/1987 | Japan . |
| 1100575 | 7/1989 | Japan . |

*Primary Examiner*—Thai Q. Tran
*Assistant Examiner*—Aung S. Moe
*Attorney, Agent, or Firm*—Whitham, Curtis, Whitham & McGinn

[57] ABSTRACT

An infrared imaging device including infrared solid state image sensing device having an image area where first infrared detectors for detecting infrared image signals are arranged in a two-dimensional array form and infrared detector groups composed of at least two kinds of second infrared detectors having different sensitivity characteristics. A processing part calculates and processes infrared image signals output from the first infrared detectors on the basis of basic data which are previously prepared as characteristics of the output signals of the second infrared detectors to remove a optical system contributory component as a noise component radiated from the infrared imaging device itself or its optical system to obtain an infrared intensity distribution image or a true temperature distribution image of an object with high reliability.

7 Claims, 9 Drawing Sheets

INFRARED IMAGING DEVICE READILY REMOVING OPTICAL SYSTEM CONTRIBUTORY COMPONENT

BACKGROUND OF THE INVENTION

The present invention relates to an infrared imaging device for use in an image sensor.

DESCRIPTION OF THE RELATED ARTS

In FIG. 1, there is shown a conventional infrared imaging device. In this infrared imaging device, an infrared lens 114 and a frame member 126 are placed in front of an infrared solid state image sensing device 116 composed of infrared detectors arranged in a two-dimensional array form, and infrared rays 141 emitted from an object 131 to be imaged are focused on an image area 111 of the image sensing device 116 by the infrared lens 114. The infrared rays 145 radiated from its optical system itself composed of the infrared lens 114 and the frame member 126 besides the infrared rays 142 radiated from the object 131 through the infrared lens 114 are incident to the image area 111. In the infrared imaging device, infrared ray contributory component radiated from the imaging device itself is eliminated and only the infrared ray component radiated from the object 131 are used for reproducing an image display. Hence, a temperature of the optical system is monitored using a frame thermometer 125 attached to the frame member 126 to estimate the infrared ray contributory component radiated from the optical system and the signal of the frame thermometer 125 is processed so as to remove the infrared ray contributory component from the output signals of the infrared detectors in the image area 111 of the image sensing device 116 in a processing part 118. Then, the output signals of the infrared detectors in the image sensing device 116 are displayed on a monitor 121.

FIG. 2A illustrates a spectral characteristic of an infrared solid state image sensing device including infrared detectors of platinum silicide Schottky diodes in the conventional infrared imaging device and FIG. 2B shows output signal characteristics of the same. The sensitivity characteristic shown in FIG. 2A is hereinafter referred to as characteristic A. The output signals in FIG. 2B are obtained in the case of an infrared solid state image sensing device combined with charge coupled devices (CCDs). In this case, a main signal is due to a contribution of the sum of the infrared rays 142 from the object 131 and the infrared rays 145 from the optical system. As shown in FIG. 2B, when a 400 mV output signal is obtained, in the case of an optical system effective temperature of 22° C., it is readily understood from point (1) that an object temperature is 32° C. Also, in the case of the optical system effective temperature of 20° C. or 18° C., the object temperature is 42° C. or 51° C. from point (2) or (3).

In this way, owing to the influence of the infrared ray contribution from the optical system, the different temperatures correspond to the same output signal (400 mV in the above case) and thus it is important to monitor the infrared ray contribution from the optical system. As to the platinum silicide Schottky infrared solid state image sensing devices, it is required to maintain their operation temperature to the liquid nitrogen temperature, that is, approximately −200° C. Accordingly, the image sensing device is held within a refrigeration container having an infrared radiation window and is refrigerated to a fixed temperature. In the first conventional case, a black body having a radiation rate of 100% is used as the object.

Another conventional infrared imaging device has been developed, as disclosed in Japanese Utility Model Laid-Open Publication No. 1-100575. In this second conventional infrared imaging device, the temperature monitoring function of the infrared image sensing device is included in the image sensing device and the temperature of the image sensing device is kept to be constant using the temperature monitor of the image sensing device. Actually, the objects to be imaged are mostly gray having a radiation rate of less than 100%. The infrared spectral radiation characteristic of the gray object depends on its true temperature and radiation rate.

A further conventional infrared imaging device obtaining such a true temperature and radiation rate of the gray object has been proposed, as disclosed in Japanese Patent Laid-Open Publication No. 60-14578. This third conventional infrared imaging device is shown in FIG. 3. In the third conventional case, as shown in FIG. 3, a plurality of infrared solid state image sensing devices 136, 137 and 138 having different infrared spectral sensitivity characteristics are provided and the same infrared rays radiated from a gray object 133 are focused onto the image sensing devices 136, 137 and 138 by an infrared lens 114. And the output signals of the image sensing devices 136, 137 and 138 are calculated and processed to output a true temperature image.

However, in the first conventional infrared imaging device using the frame thermometer, the correlation between the value indicated by the frame thermometer and the radiation infrared rays given from the optical system to the image area is not constant. The main cause of this phenomenon is considered to be due to the temperature unevenness of the parts of the optical system. In the actual use situation, a particular part of the frame member can partially be heated or cooled. In this case, it is impossible to mount a certain number of frame thermometers so as to seize this temperature unevenness precisely and this makes the device construction complicated. In particular, it is very difficult to monitor the temperature unevenness of the infrared lens itself. Therefore, it can be understood that it is very difficult to accurately grasp the optical system radiation infrared ray contribution from the detected value of the frame thermometer. This problem also arises in the second and third conventional infrared imaging devices.

Moreover, in the first and second conventional infrared imaging devices, in order to obtain a temperature distribution image of the object, the radiation rate of the object must be estimated. Since the radiation rate largely depends on the surface condition of the object, if a typical radiation rate of the objective material is estimated in accordance with a physical property table or the like, it can largely be different from its actual value. A setting error of the radiation rate is directly connected to the temperature measurement error of the object. Hence, in the infrared imaging device using the infrared solid state image sensing devices, the accurate radiation temperature measurement can be applicable to only the black body having the radiation rate of 100% and the gray body whose radiation rate is apparently known.

In the third conventional infrared imaging device, the provision of a plurality of infrared solid state image sensing devices having mutually different sensitivity distribution characteristics permits to obtain a more precise true temperature. However, since the infrared rays radiated from the object are focused on the infrared solid state image sensing devices, optical parts such as beam splitters and the like are needed and also the accurate adjustments of the optical axes and the focus planes are required. Further, a part of the radiation infrared rays is lost by the addition of the optical parts such as the beam splitters and a problem of sensitivity reduction is imminent. Moreover, the output signal of the infrared imaging device is affected by its own radiation infrared ray contributory component. Accordingly, the obtained object true temperature is low in reliability.

SUMMARY OF THE INVENTION

It is therefore an object of the present invention to provide an infrared imaging device in view of the aforementioned problems of the prior art, which is capable of readily removing an influence of radiation infrared ray contributory component of the infrared imaging device itself and producing an infrared intensity distribution image or a true temperature distribution image of an object in high reliability.

In order to attain the above object, an infrared imaging device of the present invention comprises an optical system including an infrared lens; an infrared solid state image sensing device for detecting a light radiated from an object, focused by the optical system, the infrared solid state image sensing device having an image area where first infrared detectors for detecting infrared image signals are arranged in a two-dimensional array form; infrared detecting means which is arranged on the infrared solid state image sensing device outside the image area and is composed of infrared detector groups for extracting an optical system contributory component, the infrared detector groups including at least two kinds of second infrared detectors having different sensitivity characteristics to obtain at least two kinds of output signals; and processing means for carrying out a calculation processing of the infrared image signals output from the first infrared detectors within the image area on the basis of basic data which are previously prepared as characteristics of at least two kinds of the output signals obtained by the second infrared detectors of the infrared detecting means, so as to remove the optical system contributory component.

Also, the first infrared detectors can preferably be arranged in adjacent to the second infrared detectors. The second infrared detectors can preferably be arranged alternately.

The first and second infrared detectors can be arranged in adjacent to each other in a matrix form. Also, the processing means can remove the optical system contributory component from each of the output signals of the second infrared detectors to obtain third signals and produce a true temperature and a radiation rate of a gray object from the third signals. Further, the processing means can read the output signals of the second infrared detectors by an interlaced system.

Further, the first infrared detectors are preferably composed of at least two kinds of infrared detectors having different sensitivity characteristics.

Hence, in the infrared imaging device of the present invention, at least two kinds of infrared detectors having mutually different sensitivity characteristics are arranged outside the image areas of the infrared solid state image sensing device for detecting the radiation light focused by the optical system and the characteristics of at least two kinds of output signals obtained from at least two kinds of the infrared detectors are prepared as the basic data in advance. On the basis of the basic data, the infrared image signals obtained by the first infrared detectors within the image area are calculated and processed to remove the optical system contributory component caused by the optical system.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
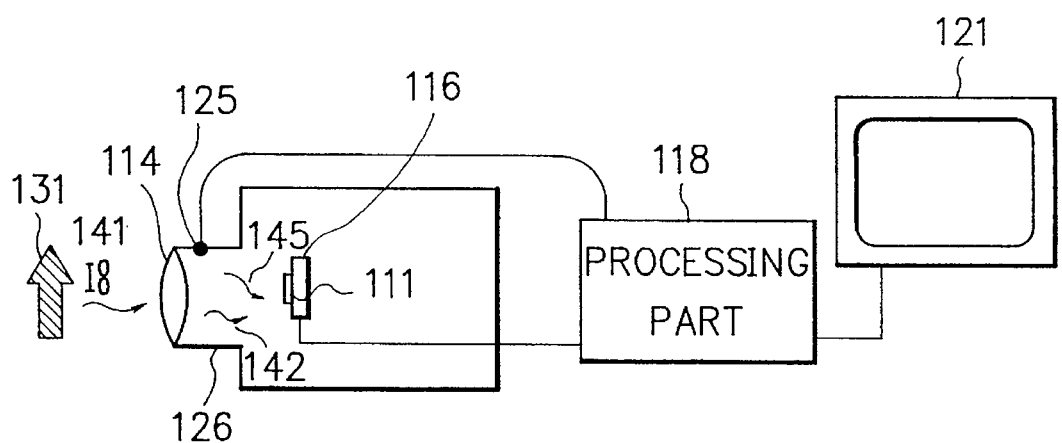
FIG. 1 is a schematic block diagram of a conventional infrared imaging device.

The present invention will now be described in connection with its preferred embodiments with reference to the accompanying drawings, wherein like reference characters designate like or corresponding parts throughout the views and thus the repeated description thereof can be omitted for brevity.

Figure 4:
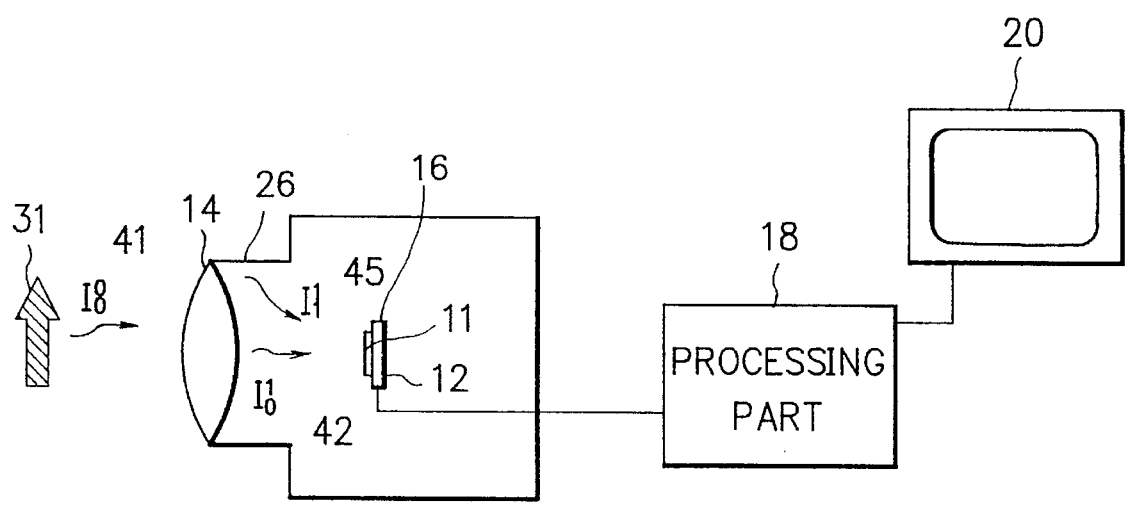
FIG. 4 is a schematic block diagram of a first embodiment of an infrared imaging device according to the present invention.

In FIG. 4, there is shown the first embodiment of an infrared imaging device according to the present invention. As shown in FIG. 4, an infrared lens 14 and a frame member 26 are placed in front of an infrared solid state image sensing device 16 having an image area 11 composed of infrared detectors arranged in a two-dimensional array form and infrared detector groups 12 for extracting a contributory component of infrared rays radiated from the optical system such as the infrared lens 14 and the frame member 26 is provided on the image sensing device 16. The infrared detector groups 12 are composed of detectors having two kinds of mutually different spectral sensitivity characteristics. These detectors having two kinds of different spectral sensitivity characteristics can be produced by adding an optical filter and combining a variety of interband transition infrared detectors (HgCdTe, InSb and the like) having different spectral sensitivity characteristics, Schottky diode (PtSi/p-Si, IrSi/p-Si, Pd2Si/p-Si or the like) detectors, and doped infrared detectors or thermal infrared detectors.

Figure 2A:
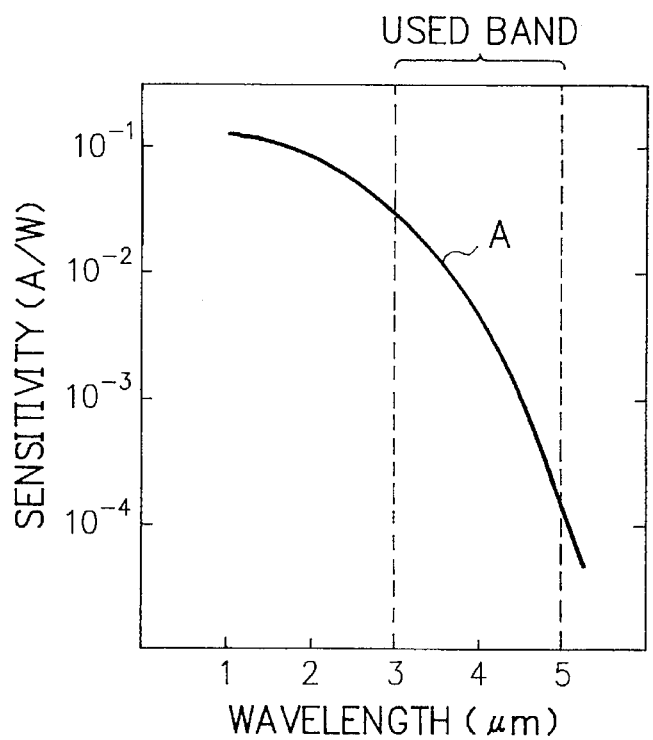
FIGS. 2A and 2B are graphical representations, the former showing a spectral sensitivity characteristic of platinum silicide Schottky diode infrared detectors in the conventional infrared imaging device and the latter showing transfer characteristics, that is, a relationship between an object temperature and an output signal of the same.
Figure 2B:
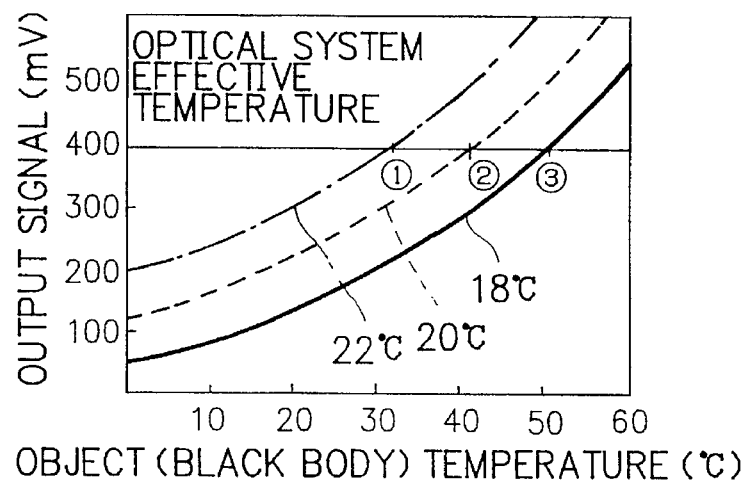
Figure 3:
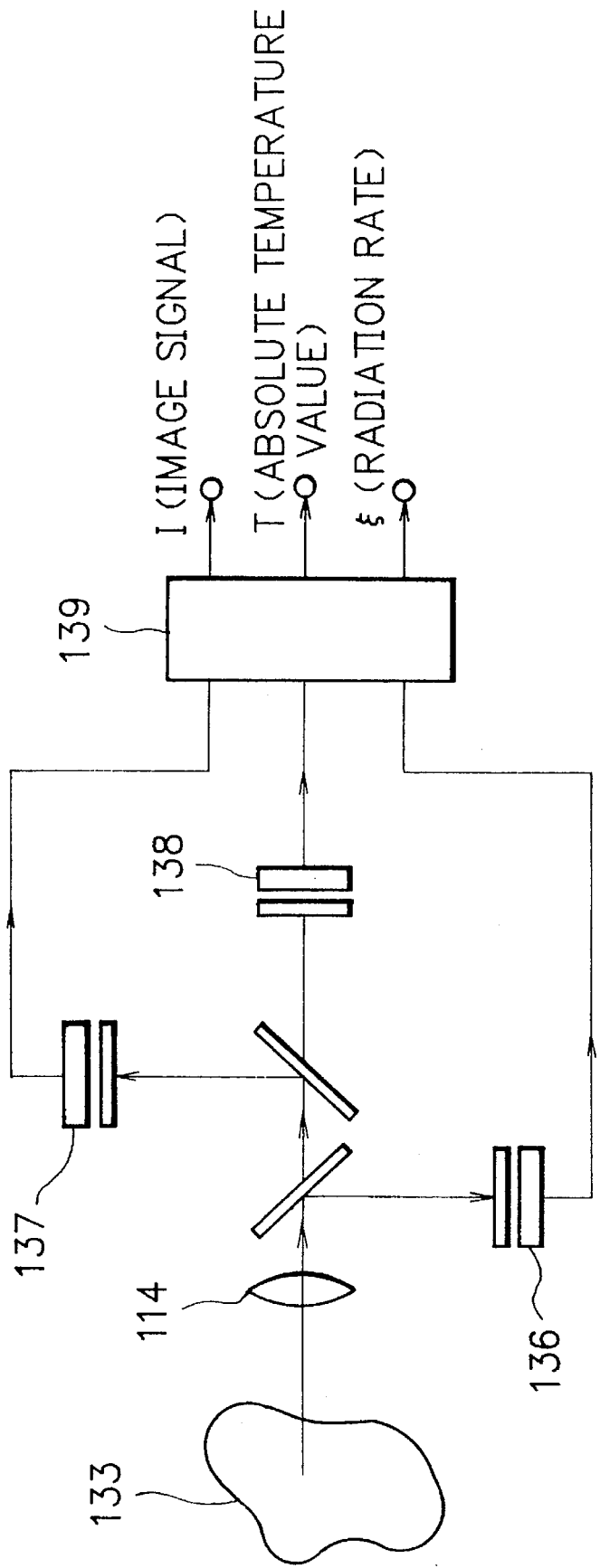
FIG. 3 is a schematic block diagram of another conventional infrared imaging device.
Figure 5A:
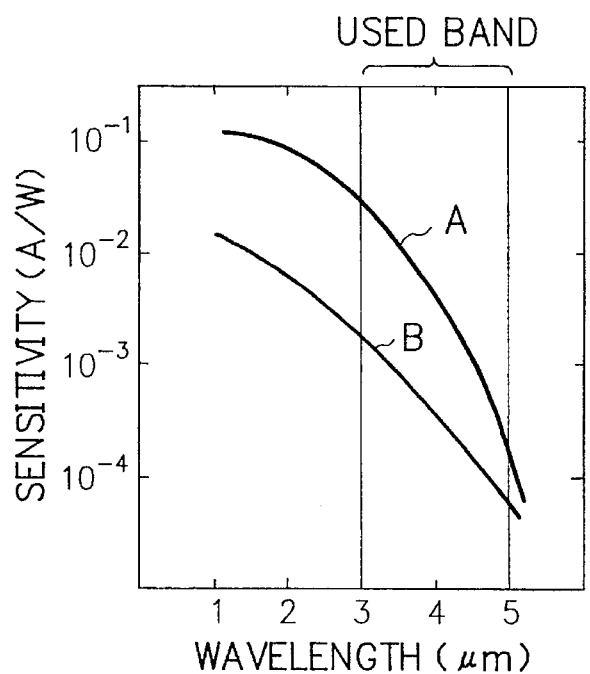
FIGS. 5A and 5B are graphical representations, the former showing spectral sensitivity characteristics of infrared detectors of the infrared imaging device shown in FIG. 4 and the latter showing output characteristics of the same, i.e., a relationship between an optical system effective temperature and an object temperature.

In the Schottky diode infrared detectors exemplified above, a Schottky barrier height is controlled by controlling a semiconductor dopant distribution at a diode interface so as to change its spectral sensitivity characteristic. Further, the spectral sensitivity characteristic can be changed by controlling an effective cavity thickness of an optical cavity structure. In this embodiment, as shown in FIG. 4, the infrared imaging device includes the infrared detector groups 12 having two kinds of spectral sensitivity characteristics A and B shown in FIG. 5A. The characteristic A widely used hitherto is of a platinum silicide Schottky diode detector and is the same as that shown in FIG. 2A. The characteristic B can be obtained by doping arsenic (As) near the Schottky diode interface.

In FIG. 4, infrared rays 41 radiated from an object 31 to be imaged are focused onto the image area 11 and the infrared detector groups 12 of the image sensing device 16 by the infrared lens 14 and are shown as radiation infrared rays 42 which are radiated from a black body object and are passed through the infrared lens 14. Further, other infrared rays 45 radiated from the optical system such as the infrared lens 14 and the frame member 26 are incident to the image area 11. In this case, it is assumed that the object 31 is a black body having a radiation rate of approximately 100% or a fray color body having a known radiation rate.

Figure 5B:
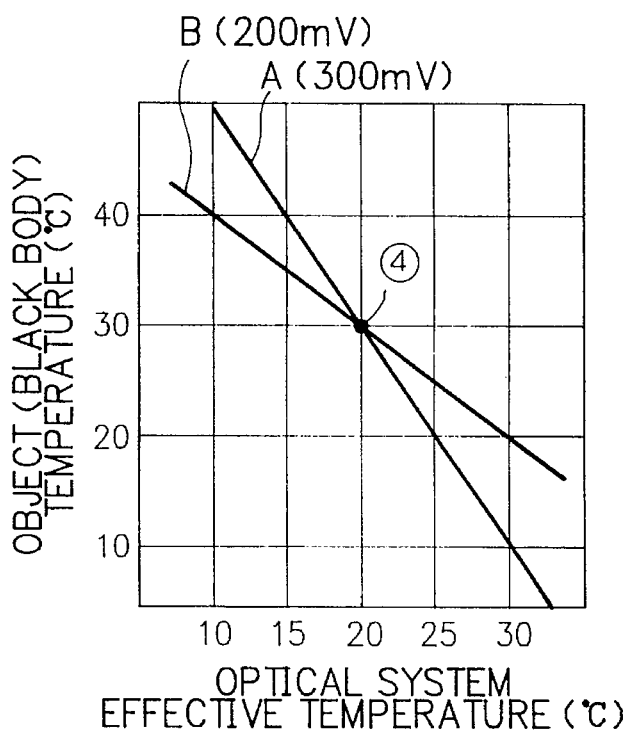

Also, the infrared rays 41 radiated from the object 31 and the infrared rays 45 radiated from the optical system are incident to the infrared detector groups 12. The output characteristics A and B of the infrared detector groups 12 with respect to these infrared rays 41 and 45 are shown in FIG. 5B. That is, it is a synthesized component of the component of the radiation infrared rays 41 depending on the object temperature and the component of the radiation infrared rays 45 depending on the effective temperature of the optical system.

Next, the explanation will be carried out using an actual example. In the situation of the device and object shown in FIG. 4, it is assumed that it is apparent that, when the output of the infrared detector groups 12 with respect to the characteristic A is 800 mV, there is a relationship shown by the characteristic A in FIG. 5B between its optical system effective temperature and its object (black body) temperature. In this case, when a correlation as shown in FIG. 5B is satisfied, such a correlation once obtained in an arranged environment in advance can be used as reproducible basic data with full confidence. In FIG. 5B, although only the correlations with the output 300 mV on the characteristic A and the output 200 mV on the characteristic B are shown, the correlations with all the outputs can be prepared in advance.

More specifically, the process for obtaining the radiation infrared ray contributory component from the optical system will be described. In the case where the outputs of the characteristics A and B are 300 mV and 200 mV, respectively, an optical system effective temperature at an intersection (4) of the characteristics A and B, that is, the optical system effective temperature can be obtained as 20° C. from their relationship shown in FIG. 5B.

This optical system effective temperature represents the infrared ray contributory component radiated from the optical system and should be removed as a noise component radiated from the infrared imaging device itself. By removing this optical system radiation component from the output signals of the image area 11, the reliability of the output signals of the image area 11 can be improved. A processing part 18 processes the output signals of the infrared detector group so as to remove the radiation infrared ray contributory component, that is, the noise component from the output signal of the image area. Hence, the processing part 18 stores the above basic data, compares the signals output from the infrared detector groups 12 with the basic data, calculates the optical system effective temperature and the contributory output component, and removes the contributory output component from the output signal of the image area 11. The output signal of the processing part 18 is displayed on an image display monitor 20.

In FIG. 4, although no frame thermometer is shown, an output signal of the frame thermometer can be used as supplementary information in the processing part 18 when the optical system effective temperature is obtained. For example, by comparing the temperature indicated by the frame thermometer with only frame temperature conversion basic data within a range of, for example, ±5° C., the data to be processed can be reduced, resulting in reducing the processing time.

Figure 6:
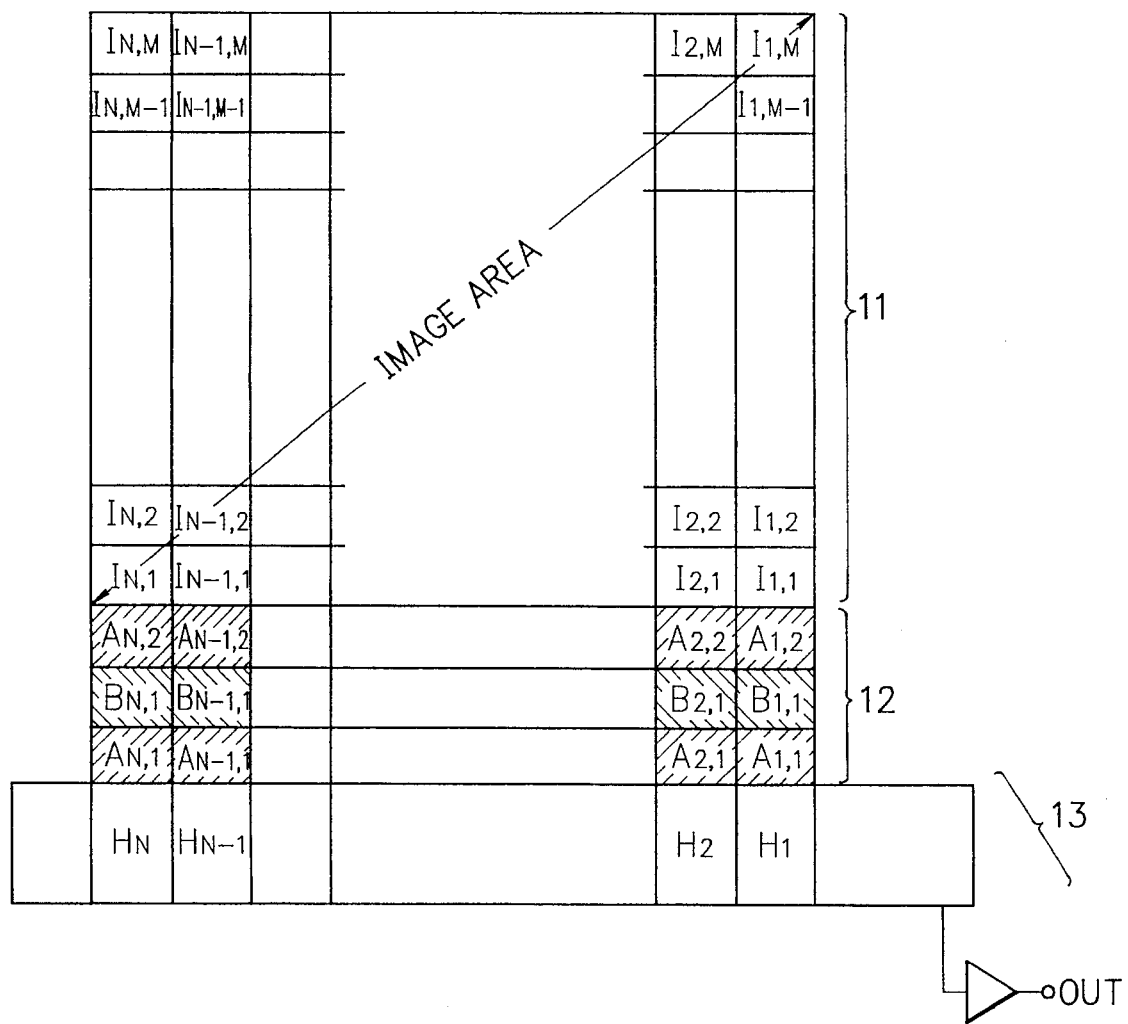
FIG. 6 is a schematic view conceptually showing an infrared solid state image sensing device used in a second embodiment of an infrared imaging device according to the present invention.

In FIG. 6, there is shown an infrared solid state image sensing device in the second embodiment of an infrared imaging device according to the present invention. In this embodiment, as shown in FIG. 6, a plurality of infrared detectors I1,1 to In, m (see the structure in FIG. 4 for an exemplary placement of the infrared detectors) corresponding to pixels arranged in a M x N matrix form in the image area 11 of the image sensing device 16. The infrared detector groups 12 for monitoring the optical system effective temperature are placed between the image area 11 and an output part 13. In this embodiment, the infrared detector groups 12 are constructed in the same manner as the image area 11 so that the output signals of the image area 11 and the infrared detector groups 12 may be read out similarly. For example, in the case of a Schottky CCD infrared image sensor, the output signals of both the members 11 and 12 can be read out as time series signals from an output terminal via the horizontal CCDs (H1 to HN).

In this embodiment, the infrared detector groups 12 are composed of detector groups having different characteristics A and B and one line of characteristic B infrared detectors are put between two lines of characteristic A infrared detectors. When the light radiated from the object having a uniform temperature and a uniform radiation rate and the uniform infrared rays radiated from the optical system are incident to the area A2,2. B2,1 and A2,1. Since A2,2 and A2,1 have the equal sensitivity characteristic, the same output signal is obtained from A2,2 and A2,1. In this sandwich structure, by comparing the output signals of A2,2 and A2,1, first, the above-described uniform radiation can be confirmed. Furthermore, by carrying out the mutual comparison shown in FIG. 5B, the reliability of the obtained optical system effective temperature can be improved much more. Further, as shown in FIG. 6, the provision of the plurality lines of sandwich structure of the infrared detector group 12 permits improving of the probability for obtaining the areas of the aforementioned conditions. Also, by comparing the signals of the plurality of detector groups, the reliability can further be improved. In this embodiment shown in FIG. 6, although the vertically sandwiched structure is shown, the detectors having different characteristics can be arranged in a two-dimensional form and detectors having at least three kinds of sensitivity characteristics can be arranged alternately.

Figure 7:
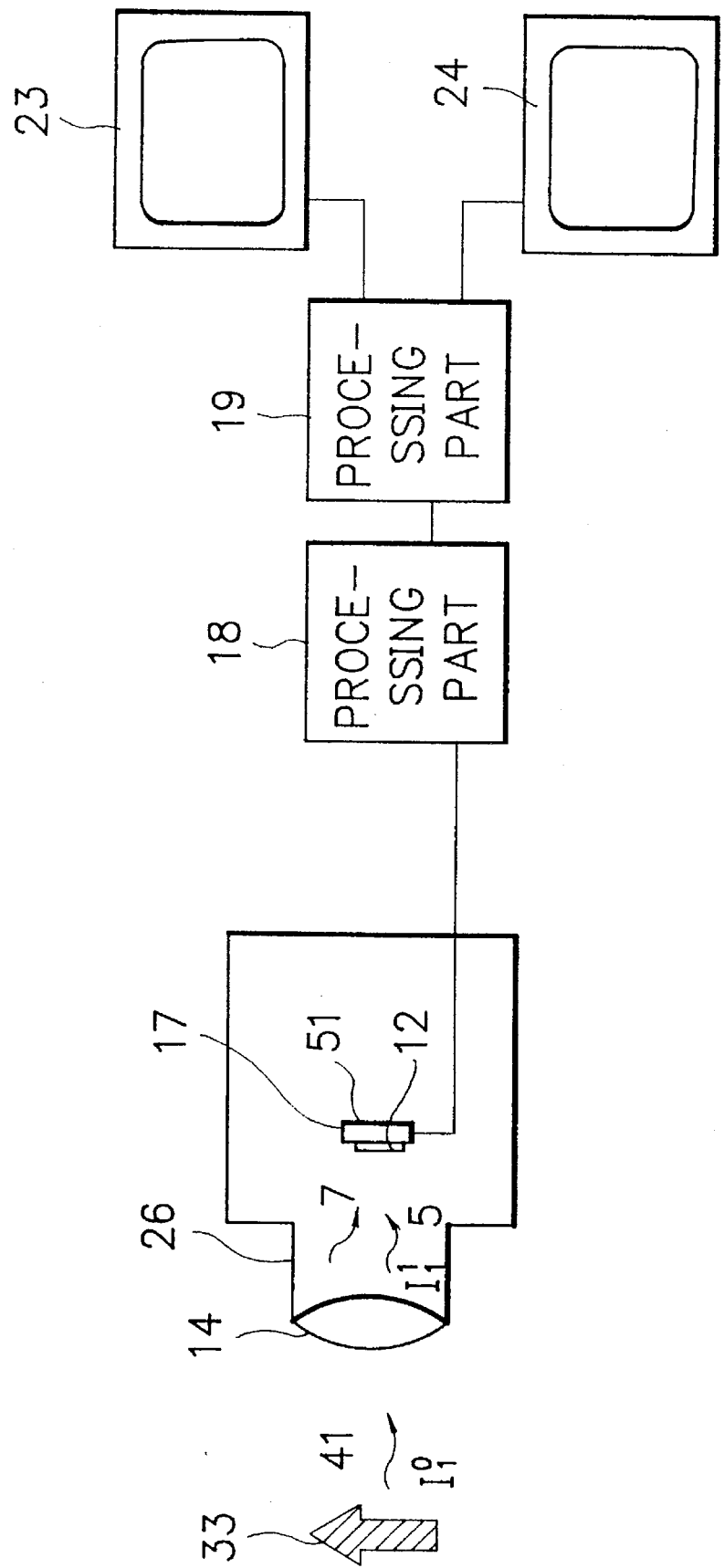
FIG. 7 is a schematic block diagram of a third embodiment of an infrared imaging device according to the present invention.

FIG. 7 illustrates the third embodiment of an infrared imaging device according to the present invention and FIG.

8 shows another image sensing device used in the infrared imaging device shown in FIG. 7. In this embodiment, an image sensing device 17 includes an image area 51 where infrared detectors having different sensitivity characteristics (for example, IAK,1 of the characteristic A and IBK,1 of the characteristic B in FIG. 8) are arranged in a matrix form. In this embodiment, a gray object 33 is to be imaged. Another processing part 19 separates the output of the processing part 18 into a gray object true temperature and a radiation rate and a true temperature image display monitor 23 and a radiation rate image display monitor 24 are connected to the processing part 19 in addition to the optical system radiation contributory output function in the first embodiment shown in FIG. 4.

Figure 9:
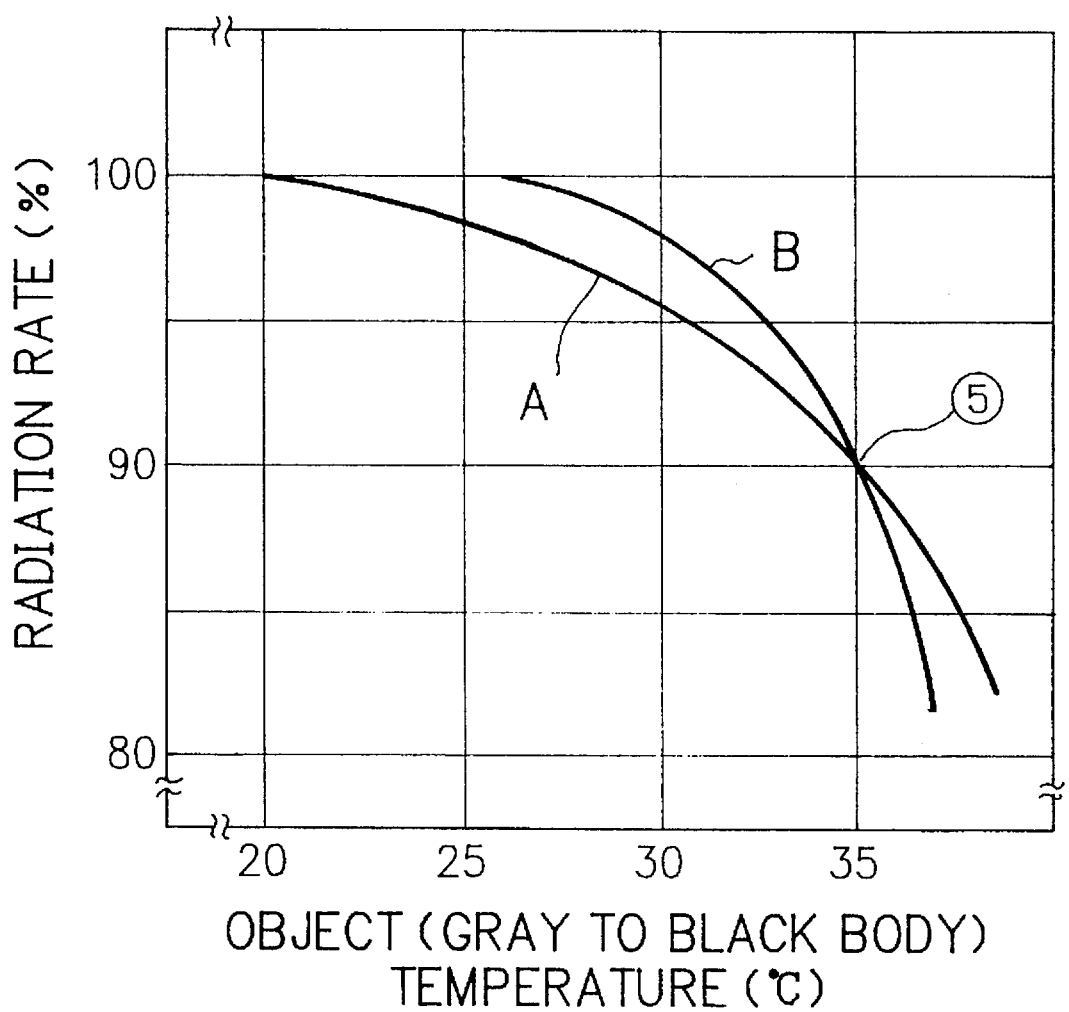
FIG. 9 is a graphical representation showing a relationship between an object temperature and a radiation rate in the third embodiment of the present invention.

The operation of the infrared imaging device described above will now be described. Now, when a repeat pitch of the matrix in which image areas IAK,1 and IBK,1+1 are deemed as one set is small enough in comparison to the size of the object or the temperature distribution and the radiation rate distribution when the repeat pitch is focused on the image area, the uniform infrared rays are considered to be irradiated to the areas IAK,1 and IBK,1+1. Since the characteristics of the A and B detectors are different from each other, the object true temperature and the radiation rate contribution contained in the output signal are different in the characteristics A and B. For example, this correlation is shown in FIG. 9. The correlation of the object true temperatures, the radiation rates and the output signals of the two kinds of detectors can be stored as the basic data in advance.

In this embodiment, in the same manner as the case where the contributory component of the infrared rays radiated from the optical system is obtained, when the uniform light is incident to the adjacent characteristics A and B, the true temperature and the radiation rate can be obtained by the comparison between the output signals of both the members and the above-described basic data. In this case, as described hereinafter, the infrared ray components radiated from the optical system must be corrected at the preceding stage of the calculation for the true temperature.

Figure 8:
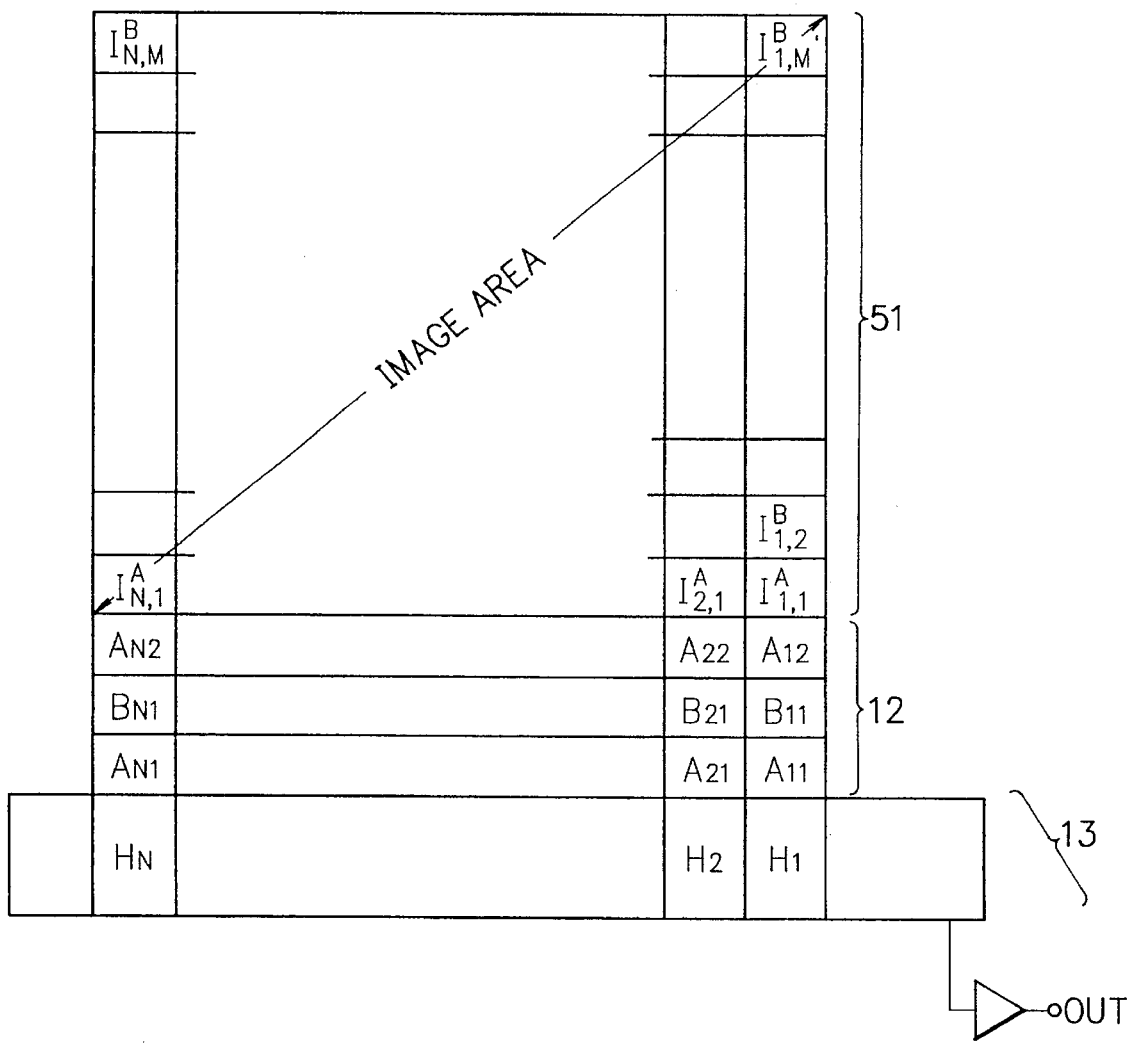
FIG. 8 is a schematic view conceptually showing another infrared solid state image sensing device used in the third embodiment of the infrared imaging device shown in FIG. 7.

The coincident point of two detectors is shown by (5) in FIG. 9. The image area 51 besides the infrared detector groups 12 is constructed in the matrix form of the different infrared detectors, as shown in FIG. 8, to obtain the true temperature and the radiation rate distribution of the gray object. On this occasion, what is important is in the construction shown in FIG. 7 that first the infrared ray contributory component radiated from the infrared imaging device itself is removed from the output signal of the image area 51 and then the true temperature and the radiation rate are obtained using the above correlation shown in FIG. 9. Since the radiation rates of the objects generally depend on their wavelengths, it is required to execute the processing with sufficient attention. In the embodiments of the present invention, the detectors having the same wave-length band shown in FIG. 5A and analogous characteristics A and B are used. It is important to select the optimum detectors depending on the temperature and the radiation rate of the object.

According to the third embodiment, the detectors having different sensitivity characteristics are used in the image area 51 and an interlaced system for reading every detector of the same sensitivity can preferably be used. In this case, although spatial resolution somewhat degrades, an image free of problems can be obtained by an integration operation.

As apparent from the above description, according to the present invention, in the infrared imaging device, at least two kinds of infrared detectors having mutually different sensitivity characteristics are arranged outside the image areas of the infrared solid state image sensing device for detecting the radiation light focused by the optical system and the characteristics of at least two kinds of output signals obtained from at least two kinds of the infrared detectors are prepared as the basic data in advance. On the basis of the basic data, the signal component caused due to the infrared ray radiation of the infrared imaging device itself, particularly, its optical system can be removed. Further, the temperature distribution image of the black body of the gray object having the known radiation rate can be obtained with high reliability.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An infrared imaging device, comprising:

an optical system including an infrared lens;

an infrared solid state image sensing device for detecting a light radiated from an object, focused by the optical system, the infrared solid state image sensing device having an image area where first infrared detectors for detecting infrared image signals are arranged in a two-dimensional array form;

infrared detecting means being arranged on the infrared solid state image sensing device outside the image area and comprising infrared detector groups for extracting an optical system contributory component, the infrared detector groups including at least two kinds of second infrared detectors having respectively different sensitivity characteristics to obtain at least two kinds of output signals; and processing means for carrying out a calculation processing of the infrared image signals output from the first infrared detectors within the image area on the basis of basic data previously prepared as characteristics of said at least two kinds of the output signals obtained by the second infrared detectors of the infrared detecting means, so as to remove the optical system contributory component.

2. The infrared imaging device as claimed in claim 1, wherein the first infrared detectors are arranged adjacent to the second infrared detectors.

3. The infrared imaging device as claimed in claim 1, wherein the second infrared detectors are arranged alternately.

4. The infrared imaging device as claimed in claim 1, wherein the first and second infrared detectors are arranged adjacent to each other in a matrix form.

5. The infrared imaging device as claimed in claim 4, wherein the processing means removes the optical system contributory component from each of the output signals of the second infrared detectors to obtain third signals and produces a true temperature and a radiation rate of a gray object from the third signals.

6. The infrared imaging device as claimed in claim 4, wherein the processing means reads the output signals of the second infrared detectors by an interlaced system.

7. The infrared imaging device as claimed in claim 4, wherein the first infrared detectors comprise at least two kinds of infrared detectors having different sensitivity characteristics.

* * * * *